(12) United States Patent
Rothman et al.

(10) Patent No.: US 8,688,965 B2
(45) Date of Patent: Apr. 1, 2014

(54) SYSTEM AND METHOD FOR INCREASING PLATFORM NETWORK BOOT EFFICIENCY

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 1737 days.

(21) Appl. No.: 11/729,078

(22) Filed: Mar. 27, 2007

(65) Prior Publication Data

US 2008/0082809 A1  Apr. 3, 2008

Related U.S. Application Data

(63) Continuation-in-part of application No. 11/541,242, filed on Sep. 29, 2006, now Pat. No. 8,082,431.

(51) Int. Cl.
*G06F 9/00*  (2006.01)

(52) U.S. Cl.
USPC .............................................. 713/1

(58) Field of Classification Search
USPC .............................................. 713/1
See application file for complete search history.

(56) References Cited

U.S. PATENT DOCUMENTS

| | | | |
|---|---|---|---|
| 6,965,989 B1 * | 11/2005 | Strange et al. | 713/1 |
| 7,376,949 B2 * | 5/2008 | Lowell et al. | 718/1 |
| 7,386,711 B1 * | 6/2008 | Haimovsky et al. | 713/2 |
| 7,496,961 B2 * | 2/2009 | Zimmer et al. | 726/23 |
| 2005/0144434 A1 * | 6/2005 | Taylor et al. | 713/2 |
| 2006/0143432 A1 | 6/2006 | Rothman et al. | |

OTHER PUBLICATIONS

Office Action received for European Patent Application No. 08250955.5, mailed on Aug. 11, 2009, pp. 7.
Office Action received for Chinese Patent Application No. 200810087275.8, mailed on Mar. 24, 2010. 7 pages of Office Action and English translation of 12 pages.
Office Action received for the European Patent Application No. 08250955.5, mailed on Feb. 8, 2011, 6 pages.
Office Action received for the Chinese patent Application No. 200810087275.8, mailed on Jul. 29, 2011, 13 pages of Translation and 8 pages of Office Action.
Office Action received for the Chinese patent Application No. 200810087275.8, mailed on Mar. 3, 2011, 11 pages of Translation and 7 pages of Office Action.
EP Oral Proceedings Summons from related case EP08250955.5 mailed May 31, 2012 (5 pages).
Office Action received for Chinese Patent Application No. 200810087275.8 mailed on Oct. 24 ,2013, 6 pages of Office Action including 3 pages of English Translation.

* cited by examiner

*Primary Examiner* — Kim Huynh
*Assistant Examiner* — Eric Chang
(74) *Attorney, Agent, or Firm* — Grossman, Tucker, Perreault & Pfleger, PLLC (57) ABSTRACT

Embodiments of the invention involve decreasing boot time by utilizing virtualization or partitioning techniques. In an embodiment, a hypervisor/platform partition controls the platform access to the boot target medium. The boot target medium may be a local medium or a remote medium on a server. When the boot medium is a local medium, the boot target data is selectively stored in a fast memory. When the boot target medium is a remote medium, the boot target data is stored in a local medium. When the system reboots, or an operating system on the platform is reset, boot target data may be retrieved from the fast, local memory rather than the original, slower boot target medium. Other embodiments are described and claimed.

30 Claims, 5 Drawing Sheets

SYSTEM AND METHOD FOR INCREASING PLATFORM NETWORK BOOT EFFICIENCY

CROSS-REFERENCE TO RELATED APPLICATION

This application is a Continuation In Part Application to U.S. patent application Ser. No. 11/541,242, entitled "System And Method For Increasing Platform Boot Efficiency," filed on 29 Sep. 2006 now U.S. Pat. No. 8,082,431 by Michael A. Rothman et al., assigned to a common assignee, the entire subject matter which is herein incorporated by reference.

FIELD OF THE INVENTION

An embodiment of the present invention relates generally to computing platforms and, more specifically, to decreasing boot time by utilizing virtualization or partitioning techniques. In an embodiment, a hypervisor/platform partition will control the platform and allow for the initialization of a remaining main partition.

BACKGROUND INFORMATION

Various mechanisms exist for increasing platform boot efficiency, or decreasing boot time, have been implemented in existing systems.

Many vendors and users of platforms are concerned with the amount of time it takes to boot a platform. In this sense, booting comprises powering on the platform and proceeding to the point of getting a user login prompt or being able to run user applications. There are many standards associated with ensuring that platforms can run through the firmware path as quickly as possible. The time required to launch an operating system (OS) may vary based on the complexity of the OS. A typical desktop platform may take 7.5 seconds to boot to launch of the OS. The actual standards are driven by the industry as a whole. This is also evident in the server environment to accommodate highly available systems. The shorter the boot time, the more available the server will be after maintenance or crash. Faster boot times are extremely desirable in systems having a requirement to be highly available/reliable or in Internet cafés where systems are rebooted after each user's session. In addition, remote network boot can be extremely time intensive. The typical overhead associated with reading all the normal platform remote boot content from a server disk is usually between 20-300 seconds. Much of the overhead associated with the loading of the operating system (OS) has to do with the low data throughput of remote network attachment, and reading from a high latency low speed spigot on which the data resides (e.g. remote server).

BRIEF DESCRIPTION OF THE DRAWINGS

The features and advantages of the present invention will become apparent from the following detailed description of the present invention in which.

DETAILED DESCRIPTION

An embodiment of the present invention is a system and method relating to speeding network boot time of a platform. The boot time overheard for a normal platform boot requires ~350 MB of data transfer. This transfer adds between 28-280 seconds of boot time using today's common networking throughput. Embodiments of the invention described herein provide for the capability of improving this 4-22 seconds of overhead to something more akin to ⅕ to ⅓ of a second.

Reference in the specification to "one embodiment" or "an embodiment" of the present invention means that a particular feature, structure or characteristic described in connection with the embodiment is included in at least one embodiment of the present invention. Thus, the appearances of the phrase "in one embodiment" appearing in various places throughout the specification are not necessarily all referring to the same embodiment.

For purposes of explanation, specific configurations and details are set forth in order to provide a thorough understanding of the present invention. However, it will be apparent to one of ordinary skill in the art that embodiments of the present invention may be practiced without the specific details presented herein. Furthermore, well-known features may be omitted or simplified in order not to obscure the present invention. Various examples may be given throughout this description. These are merely descriptions of specific embodiments of the invention. The scope of the invention is not limited to the examples given.

Figure 1:
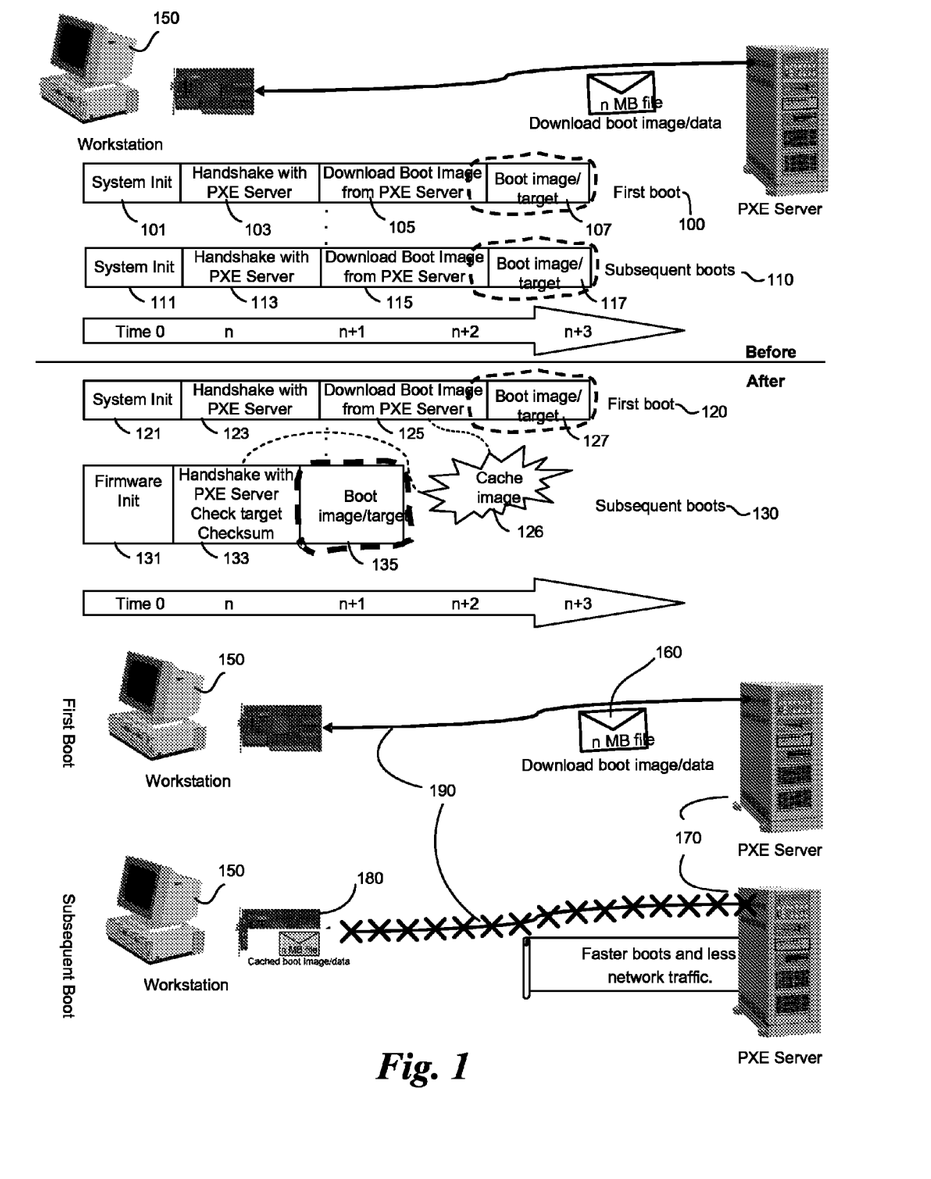
FIG. 1 is a is a block diagram illustrating timelines for network booting in existing systems compared to timelines for network booting according to embodiments of the present invention.

FIG. 1 is a block diagram illustrating timelines for network booting in existing systems compared to timelines for network booting according to embodiments of the present invention. In existing systems, as shown in the top half of the diagram, a first boot 100 may take time n+3. In existing systems, a first boot of a platform must first perform system initialization tasks 101. Handshaking with the PXE server 103 is performed next. The Pre-boot Execution Environment (PXE, also known as, Pre-Execution Environment) is an environment to bootstrap computers using a network interface card independently of available data storage devices (like hard disks) or installed operating systems. PXE was introduced as part of the Wired for Management framework by Intel Corporation and is described in the specification (v2.1) published by Intel Corp. and Systemsoft on Sep. 20, 1999. The specification may be found on the public Internet at URL www*pix*net/software/pxeboot/archive/pxespec.pdf. It should be noted that periods are replaced with asterisks in URLs in this document to avoid inadvertent hyperlinks. PXE makes use of several network protocols like IP, UDP (User Datagram Protocol), DHCP (Dynamic Host Configuration Protocol) and TFTP (trivial file transfer protocol) and of concepts like GUID/UUID (globally unique identifier/universally unique identifier) and Universal Network Device Interface and extends the firmware of the PXE client (the computer to be bootstrapped via PXE) with a set of predefined APIs (application programming interfaces). Once the handshaking is completed, the boot image may be downloaded from the PXE server 105. It will be understood that other types of servers using other protocols may be used for the boot target media. Once the boot image is downloaded to the platform, the image is booted from the target 107. These tasks must be completed to first boot a platform and take a time of n+3 to complete. In existing systems, any subsequent boot 110 must perform the same functions 111, 113, 115 and 117 and will also take time n+3 to complete.

In embodiments of the present invention, a first boot 120 will perform virtually the same functions 121, 123, 125 and 127 as in existing systems. One exception is that when the boot image is downloaded from the PXE server 125, an image of the boot may be cached at 126. This cache image will be used in subsequent boots to speed boot time from the network. The first boot will still take a time of approximately n+3 to complete.

In an embodiment, during a subsequent boot 130, the tasks performed are altered to enhance boot time. The firmware is initialized at 131. Handshaking with the PXE server is performed to retrieve a checksum, or similar technique, for the target boot image in 133. If the checksum or other verification technique is validated, then the boot image may be retrieved from a cache and booted in 135. In this scenario, the boot image does not need to be downloaded from the network again, if the cached version is still valid. Using the boot image from cache significantly speeds up boot time to result in a time to completion of n+1.

As can be seen from the illustration in FIG. 1, a workstation 150 must download the boot image 160 from the PXE server 170 in a first boot. In subsequent boots, the large boot image is locally stored in cache 180 and network traffic 190 is significantly reduced.

Figure 2:
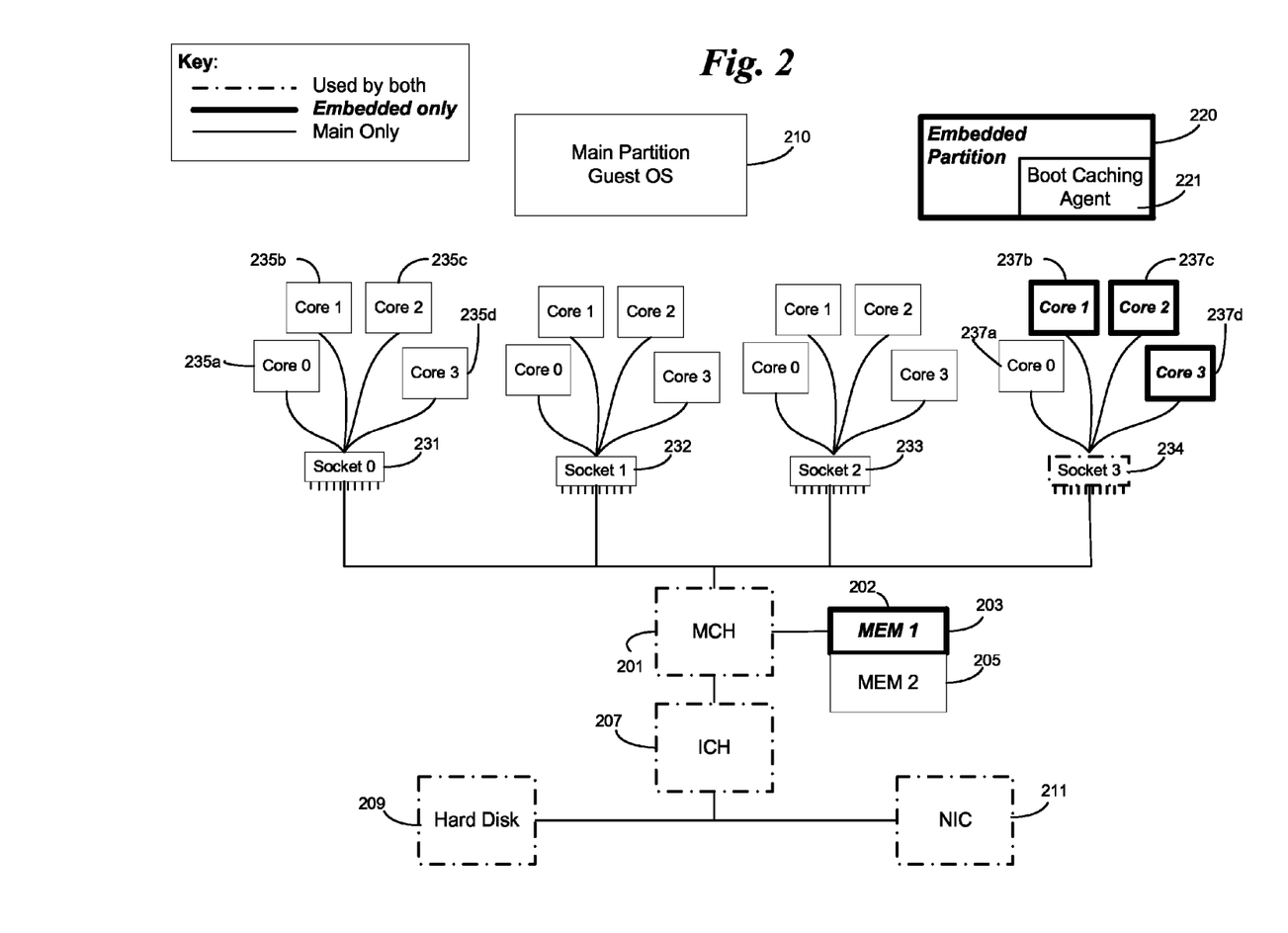
FIG. 2 is a block diagram of an exemplary platform resource layer (PRL) architecture platform, according to embodiments of the invention.

In a platform resource layer (PRL) architecture, or embedded partition architecture, various components of the platform are enhanced to enable partitioning of processor, memory and other resources. Referring now to FIG. 2, there is shown an exemplary block diagram of a PRL architecture, according to embodiments of the invention. To better illustrate partitioning, components that are available to the main partition 210 are drawn with solid blocks. Components available to the embedded, or system partition 220, are drawn with bold, solid blocks. Components available to both partitions are drawn with a block alternating with dots and dashes.

In this exemplary embodiment, a platform has four multi-core processors in Sockets 0-3 (231-234). While this example shows only four processor sockets, it will be apparent to one of ordinary skill in the art that various configurations of processors and cores may be used to practice embodiments of the invention. For instance, Socket 0 (231) may have four processing cores 235a-d. In essence, in this example, the illustrated embodiment has 16 effective processors on the platform (e.g., four sockets with four cores in each socket). In this example, Sockets 0-2 (231-233) are available only to the main partition 210. Socket 3 (234) is available to both the main partition 210 and to the embedded partition 220. Within Socket 3 (234), core 0 is available only to the main partition 210, and cores 1-3 are available only to the embedded partition 220. The embedded partition 220 has the boot caching agent 221, as more fully discussed below.

In this embodiment, the platform has a memory controller hub (MCH) 201 (also known as north bridge) coupled to memory 202. Memory 202 may have two partitions MEM1 (203) and MEM2 (205). Memory partition MEM1 (203) is available only to the embedded partition and memory partition MEM2 (205) is available only to the main partition. The chipset containing the MCH is configured to partition the memory using hardware constructs, in contrast to a virtualization solution with a virtual machine manager (VMM) which uses software constructs. It will be understood that memory 202 may be a hard disk, a floppy disk, random access memory (RAM), read only memory (ROM), flash memory, or any other type of medium readable by processor. Memory 202 may store instructions for performing the execution of embodiments of the present invention. While only two partitions are shown in this example, it will be understood that there may be more than one guest OS, each running in its own partition.

The MCH 201 may communicate with an I/O controller hub (ICH) 207, also known as South bridge, via a peripheral component interconnect (PCI) bus. The ICH 207 may be coupled to one or more components such as PCI hard drives, legacy components such as IDE, USB, LAN and Audio, and a Super I/O (SIO) controller via a low pin count (LPC) bus (not shown). In this example, the ICH 207 is shown coupled to a hard disk drive 209 and to a network interface controller (NIC) 211.

The MCH 201 is configured to control accesses to memory and the ICH 207 is configured to control I/O accesses. In an embedded partition architecture, the chipset is configured by the firmware, upon boot, to partition the various resources on the platform. In some cases, there may be only one partition and the platform acts like a legacy platform in most respects. In the example shown, there are two partitions, a main partition 210 and an embedded partition 220. Each partition designated is given a unique partition identifier (ID).

With an embedded partition configuration, when a device sends an alert, the chipset may properly route the alert to the appropriate partition, as this information is encoded at boot time. In a VMM enabled system, the hardware passes the device alerts to the VMM (virtualized devices) and the software routes the information appropriately to the various virtual machines. An embedded partition may act as hardware assisted virtualization.

In an embodiment deploying a virtualization solution, a boot caching agent is embodied within a VMM which controls all guest virtual machines (VMs) and guest operating systems (OS's) running on the platform. In another embodiment, the boot caching agent 221 is embodied in a privileged partition, process or hypervisor that controls I/O requests for individual OS's. In all cases, the boot caching agent selectively mirrors the boot image retrieved from the network PXE server during an initial boot and returns this data upon subsequent boots to avoid reading from network media. In the case of a VMM architecture, network and other device access is virtualized and the boot caching agent acts as a software intermediary to retrieve data from the device.

Figure 3:
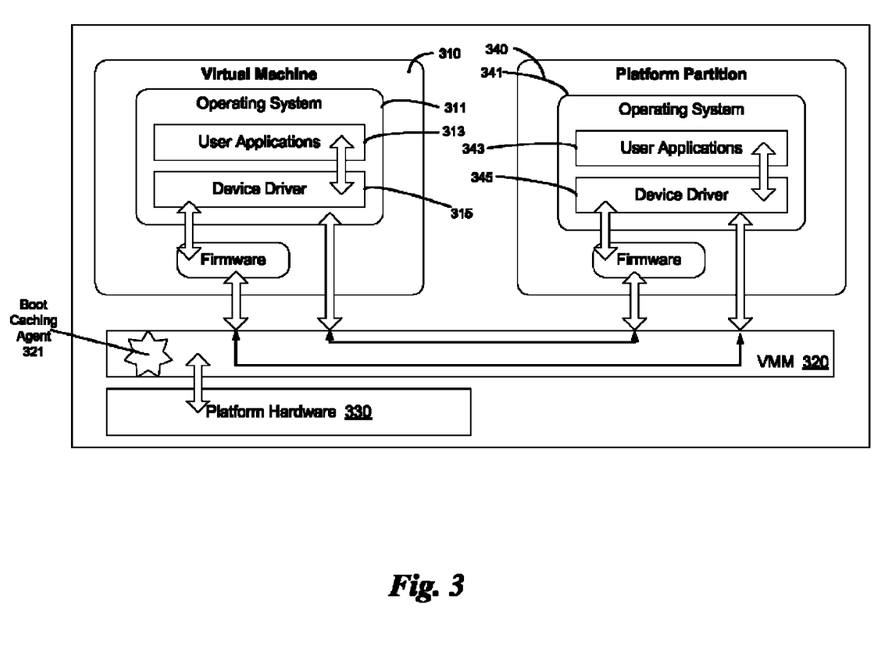
FIG. 3 is a block diagram of an exemplary virtualization platform where the boot caching agent resides in a VMM, according to embodiments of the invention.

Referring now to FIG. 3, an exemplary virtualization platform where the boot caching agent 321 resides in a VMM is shown. In this exemplary embodiment, a virtual machine (VM) 310 has a guest OS 311. Various user applications 313 may run under the guest OS 311. The OS has device drivers 315 which may be virtualized within the VMM 320. Access to platform hardware 330, including a network boot target (not shown) will require the use of the VMM. In the case of booting, a boot caching agent 321 within the VMM 320 may intercept network device access to the boot target and control whether the boot image is read from the slower network boot target or faster cached volatile memory.

Similarly, a platform partition, or more privileged partition 340 having its own OS 341, user applications 343, device drivers 345 is shown. This platform partition may also have virtualized devices via the VMM 320. In some cases, the boot caching agent will cache boot target data for this partition, as well.

Figure 4:
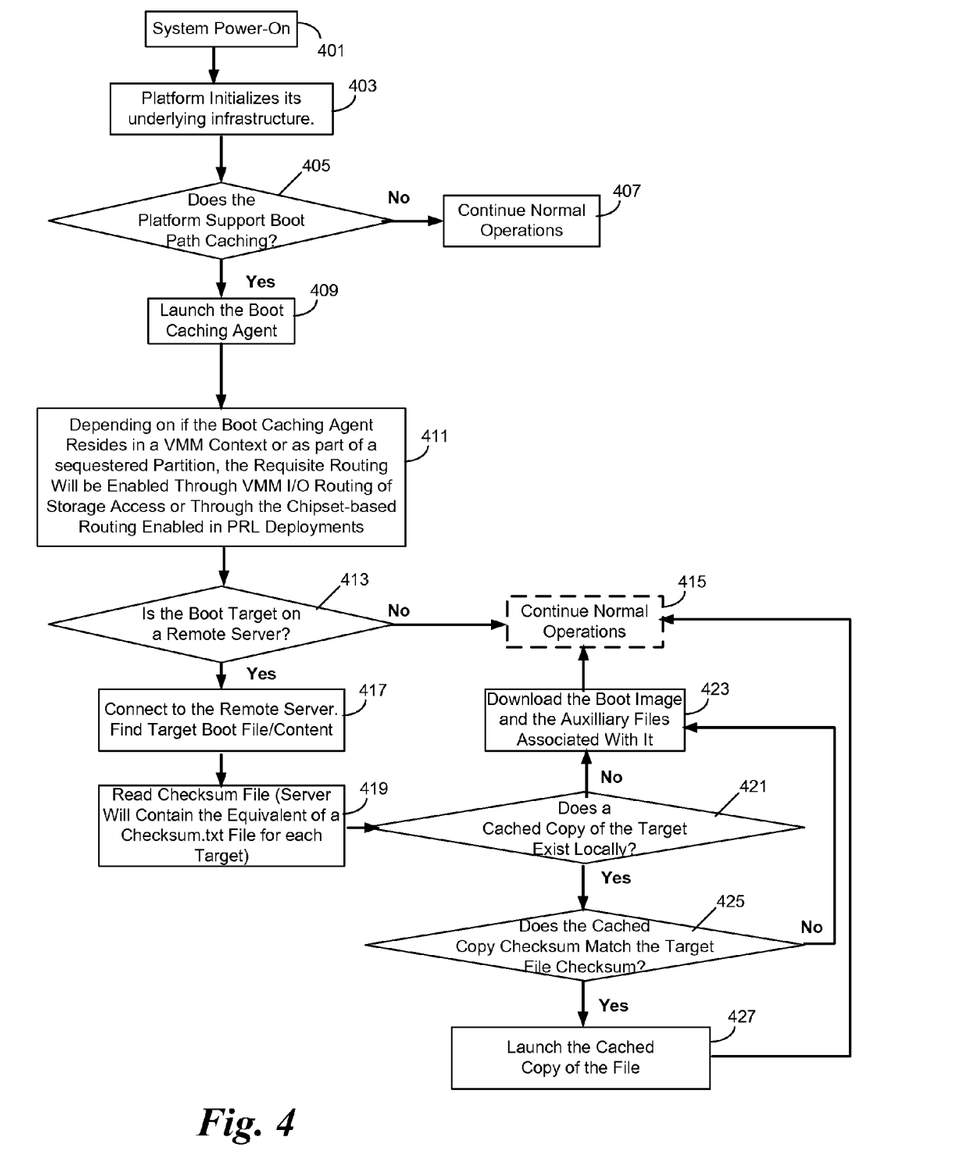
FIG. 4 is a flow diagram of an exemplary method for a boot caching agent, according to embodiments of the invention.

Referring now to FIG. 4, there is shown a flow diagram of an exemplary method for a boot caching agent, according to embodiments of the invention. The system is powered on, or a reset request is made in block 401. The underlying structure of platform is initialized, if necessary, for instance, when booting for the first time, in block 403. A determination is made as to whether the platform supports boot path caching in block 405. If not, the platform continues to boot from the boot target media in block 407.

If the platform supports boot path caching, then the appropriate boot caching agent is launched in 409. As discussed above, the boot caching agent 221/321 may reside within an embedded partition 220 or within a VMM 320, as shown in FIGS. 2 and 3. Based on the implementation of the boot caching agent, requisite routing of data is enabled, in block 411. In the case of a platform with a VMM, hypervisor, or other privileged layer, the VMM virtualizes I/O access and enables the boot caching agent to control data retrieval from the remote target boot media. The boot caching agent is enabled to mirror the boot image in a volatile store, or other local store, and index the image retrieved, for later use. In the case of a platform with chipset partitioning support, the boot caching agent residing in the embedded platform controls device access automatically, and is enabled to mirror the boot data in partitioned memory, for later use.

If the boot target is located on a remote server, as determined in 413, then the client connects to the remote server, typically via PXE handshaking in block 417. It will be apparent to one of skill in the art that access to servers using non-PXE protocols could also be implemented in other embodiments of the invention. A checksum, or other validator, such as a cyclic redundancy check (CRC) or hash code, is read from the file server in block 419. The server may contain an equivalent of a checksum.txt file for each boot image on the target. The checksum, or other validator, may be concatenated to the boot image itself, or be implemented as a separate file on the server. Various validation implementations may be employed based on system administration policy.

A determination is made as to whether a cached copy of the boot image has been previously stored (block 421) in fast, volatile or non-volatile local memory. It will be apparent from this description that the cached boot image may be stored in volatile system memory, or fast non-volatile memory coupled to the platform. Any local memory accessible during reset or power-on may be used, as it will be faster than retrieving the boot image from a network server.

If a cached copy exists, then a determination is made as to whether the cached checksum, or validator, matches the validator retrieved from the network server in block 425. It may be that the boot image residing on the server has been updated since the last boot of the platform. In that case, the validator will not match. If the cached copy is validated as being current, the cached boot image is launched in block 427. Once the cached boot image has been launched, the platform continues with normal operation in block 415.

If a cached copy of the boot image does not exist, or if the validation fails, the platform downloads the boot image and auxiliary files from the network server in block 423. At this time, the downloaded boot image is stored locally with its checksum or other validator for use in future boots. Once downloaded and launched, the platform continues normal operations in block 415.

If the boot target is not located on a remote server, as determined in block 413, the platform may continue with normal operations in block 415. In this case, normal operations may comprise booting the platform from a slow media, such as flash memory.

In another embodiment, if the platform is to boot from local media, then other methods of speeding boot time may be employed, as described in co-pending U.S. patent application Ser. No. 11/541,242, entitled "System And Method For Increasing Platform Boot Efficiency," filed on 29 Sep. 2006 by Michael A. Rothman et al., (hereinafter "Rothman et al.").

Figure 5:
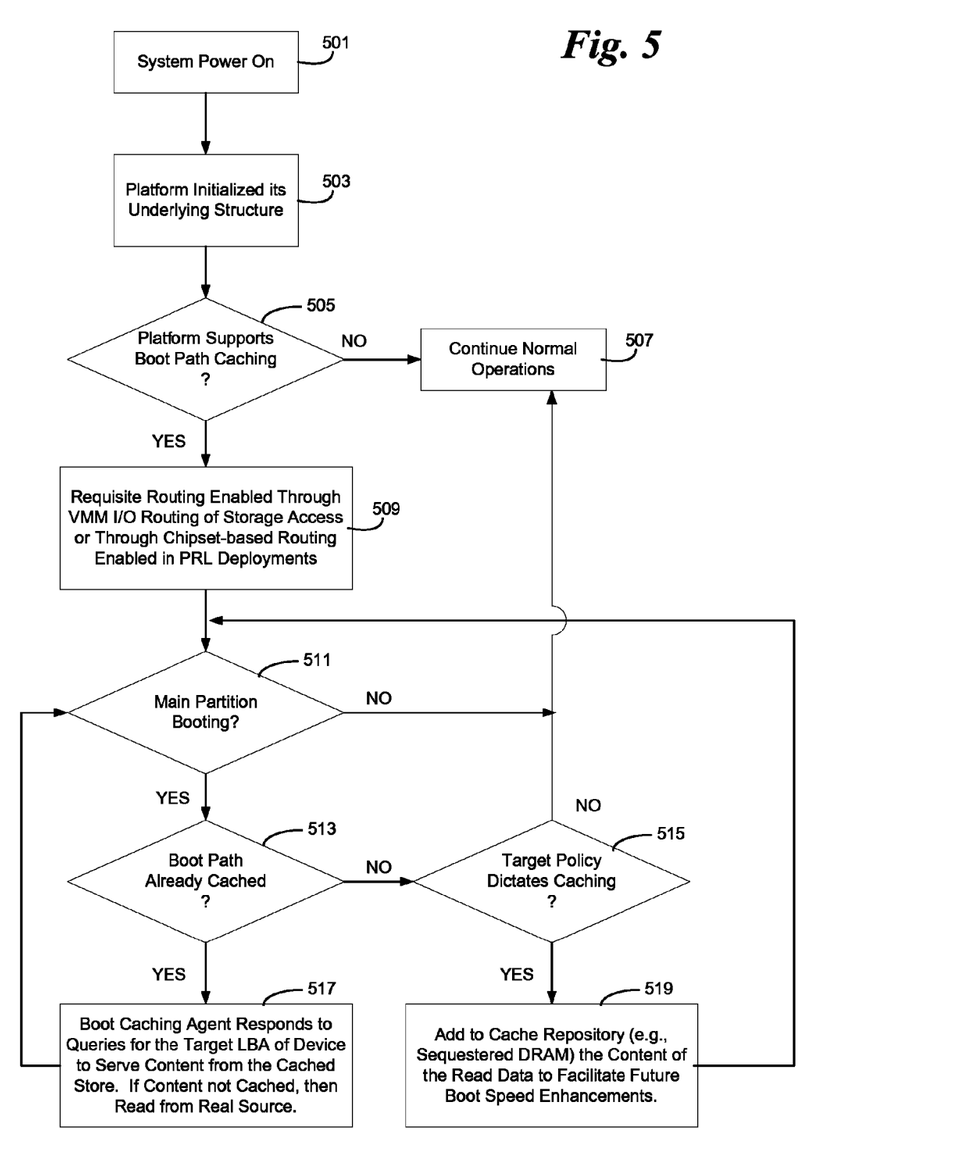
FIG. 5 is a flow diagram of an exemplary method for a boot caching agent when the boot target media is not remote, according to embodiments of the invention.

Referring to FIG. 5, there is shown an exemplary method for a boot caching agent, according to embodiments of the invention disclosed in Rothman et al. Rothman et al. disclose an embodiment of efficient booting which caches sectors of a slower boot target on a faster media, typically volatile system memory, to speed subsequent boot times. In an embodiment of the invention disclosed, the system is powered on, or a reset request is made in block 501. The underlying structure of platform is initialized, if necessary, for instance, when booting for the first time, in block 503. A determination is made as to whether the platform supports boot path caching in block 405. If not, the platform continues to boot from the local boot target media in block 507.

If the platform supports boot path caching, then the requisite routing of data is enabled, in block 509. In the case of a platform with a VMM, hypervisor, or other privileged layer, the VMM virtualizes I/O access and enables the boot caching agent to control data retrieval from the boot media. The boot caching agent is enabled to mirror the sector data in a volatile store and index the sectors retrieved, for later use. In the case of a platform with chipset partitioning support, the boot caching agent residing in the embedded platform controls device access automatically, and is enabled to mirror the boot data in partitioned memory, for later use.

If the main partition is booting, as determined in block 511, then a determination is made as to whether the boot path has been previously cached, in block 513. If so, then the boot caching agent intercepts the requests to read boot data from the boot target. If a requested sector is located in the boot caching agent index, then the sector is retrieved from the volatile store instead of the boot target media. The method used for interception depends on platform architecture, i.e., VMM or chipset partitioning (PRL).

If it was determined that it was not the main partition (or other guest OS) booting, then normal operations, i.e., normal boot, may be resumed in block 507.

If the boot path has not previously been cached, as determined in block 513, then a target policy may be consulted to determine whether the boot data should be cached. For instance, in some cases, a platform may be enabled to boot both Microsoft® Windows™ and Linux®. There may be limited memory available for caching boot target data and a user may choose to only cache data for one operating system or the other. This policy may apply to the caching as described in FIG. 4, as well. Boot data may then be cached based on which boot target has been selected for reset/boot. In other cases, a frequency of use for the boot target may be saved and only the most frequently used boot target is to be cached. In other cases, the boot target, or a portion thereof, will always be cached. It will be understood by one of ordinary skill in the art that various policies may be tailored for platforms having different functions.

If target policy dictates that the target is enabled for caching, as determined in block 515, then the sectors retrieved from the boot target are mirrored in a volatile or faster store, in block 519. While embodiments describe caching the data in volatile memory, it is contemplated that any memory may be used for caching that is faster than the boot target and still reap the benefits of the disclosed method. When a reset or reboot alert is received, processing continues again at block 511 to determine whether the main partition should be rebooted and whether data may be retrieved from a fast store, as opposed to the boot target media.

If target policy dictates that the boot data should not be cached, then operations continue with a normal boot, in block 507.

In an embodiment running a VMM, the VMM acts as an intermediary to reset requests. The VMM intercepts the reset request and resets only the portion of memory and resources used by the virtual machine running the OS making the request. Other components of the platform may not be reset. In an embodiment running with a PRL enabled chipset, the chipset may act as the intermediary and intercept the reset request.

In an embodiment of the present invention, when it is determined that the boot target is not on a remote server (block 413), then operations may continue as in block 511 of FIG. 5, as described above. Similarly, caching policy may be implemented for remote server boots, as well as local boots to avoid caching infrequently used boot targets.

It should be noted that information cached for a local boot may be in a different format than data cached for a remote boot. In an embodiment, local boot data is cached by sector. Since sector information is unknown for a remote device, boot image data is cached instead. When the platform accesses the remote server, other data may be transmitted, such as auxiliary files to the boot image. This data may be cached, as well. Selective caching of auxiliary files may be determined by a target policy. Upon boot launch the cache will be accessed first, for boot image and auxiliary files. In some cases, the cache may fill up, based on a predetermined allocated size, and missing data will be retrieved from the network server. Thus, boot times will vary based on how much data has been cached.

The techniques described herein are not limited to any particular hardware or software configuration; they may find applicability in any computing, consumer electronics, or processing environment. The techniques may be implemented in hardware, software, or a combination of the two.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product that may include a machine accessible medium having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments where tasks or portions thereof may be performed by remote processing devices that are linked through a communications network.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A system for speeding boot time, comprising:
 a platform having at least one processor coupled with memory;
 a boot caching agent running on the at least one processor in a first partition, the partition to control access to a boot target medium, wherein the boot target medium is one of a local medium or a remote medium associated with a remote server coupled to the platform via a network; and an operating system running in a second partition, wherein the second partition has access to the boot target medium via the first partition, wherein, at boot time, the boot caching agent is to selectively store boot target data retrieved from the boot target medium to a memory having faster access than the boot target medium, and wherein the boot caching agent is to selectively retrieve at least one of the stored boot target data from the faster memory or the boot target data from the boot target medium upon a reset or reboot of an operating system in the second partition, wherein, upon the reset or reboot of the operating system in the second partition, the boot caching agent is configured to:

determine whether the boot target medium is the remote medium; and if the boot target medium is the remote medium:

retrieve a validator from the remote medium, determine whether the stored boot target data is current using the validator, and if the stored boot target data is not current, retrieve boot image data and auxiliary files from the remote medium and store the boot image data, auxiliary files and validator to the memory, and if the boot target medium is the local medium:

retrieve sectors from the local medium and selectively store the retrieved sectors to faster memory.

2. The system as recited in claim 1, wherein the faster memory is volatile system memory, and wherein an operating system outside of the first partition has no access to the stored boot target data in the faster memory.

3. The system as recited in claim 1, wherein the platform is enabled for chipset partitioning, and wherein the boot caching agent resides in an embedded partition.

4. The system as recited in claim 3, wherein the chipset is to enable a resource to be dedicated to a selected partition, wherein partitioning is defined by platform firmware upon booting.

5. The system as recited in claim 3, wherein the embedded partition is a privileged partition to automatically intercept device access to the boot target medium.

6. The system as recited in claim 3, wherein the boot caching agent is to locally store a boot image file retrieved from a remote boot target medium.

7. The system as recited in claim 4, wherein the boot caching agent is to determine whether a valid remote boot image has been stored locally, and if not retrieves the requested boot image from the remote boot target medium, otherwise the boot caching agent is to retrieve the valid locally stored boot image from the stored memory.

8. The system as recited in claim 1, wherein the faster memory is non-volatile memory, and wherein an operating system outside of the first partition has no access to the stored boot target data in the faster memory.

9. The system as recited in claim 1, wherein the platform is enabled for virtualization, and wherein the boot caching agent resides in a virtual machine monitor (VMM).

10. The system as recited in claim 9, wherein the VMM virtualizes device access to the boot target medium.

11. The system as recited in claim 9, wherein the boot caching agent is to determine whether a valid remote boot image has been stored locally, and if not is to retrieve the requested boot image from the remote boot target medium, otherwise the boot caching agent is to retrieve the valid locally stored boot image from the stored memory.

12. The system as recited in claim 1, wherein the boot caching agent is to selectively store a boot image and auxiliary boot files from a remote boot target medium based on a target policy.

13. A method for speeding boot time, comprising:

selectively storing boot target data retrieved at boot time by a boot caching agent, wherein the boot target data is retrieved from a boot target medium and stored in a memory faster than the boot target medium, and wherein the boot target medium is one of a local medium or remote medium associated with a remote server accessible to the boot caching agent via a network; and upon a reboot of an operating system, retrieving the boot target data from at least one of the stored boot target data and the boot target medium, the retrieving controlled by the boot caching agent, the retrieving comprising:

determining whether the boot target medium is the remote medium; and if the boot target medium is the remote medium:

retrieving a validator from the remote medium, determining whether the stored boot target data is current using the validator, and if the stored boot target data is not current, retrieving boot image data and auxiliary files from the remote medium and storing the boot image data, auxiliary files and validator to the memory, and if the boot target medium is the local medium:

retrieving sectors from the local medium and selectively storing the retrieved sectors to faster memory.

14. The method as recited in claim 13, wherein the boot caching agent resides in a first platform partition and the operating system resides in a second platform partition.

15. The method as recited in claim 14, wherein the first platform partition is a virtual machine monitor, and the second partition is a virtual machine.

16. The method as recited in claim 14, wherein the first platform partition is an embedded partition of a platform enabled with chipset partitioning.

17. The method as recited in claim 14, wherein the faster memory is volatile system memory, and wherein the second partition has no access to the stored boot target data.

18. The method as recited in claim 14, further comprising:

storing an index of sectors retrieved from the boot target medium, when the boot target medium is a local medium, to identify stored sectors of data, by the boot caching agent.

19. The method as recited in claim 14, wherein the retrieving the boot target data further comprises:

determining whether requested boot target data has been stored and if not, retrieving the requested boot target data from the boot target medium, wherein the boot target data comprises boot sector information for a local medium, and wherein the boot target data comprises a boot image, selective auxiliary files and a validator for a remote medium, otherwise, retrieving the requested boot target data from the stored memory.

20. The method as recited in claim 19, further comprising:

if the validation is successful, retrieving the boot target data from stored memory, but if the validation fails, then retrieving the boot target data from the remote boot target medium.

21. The method as recited in claim 13 wherein selectively storing boot target data further comprises:

selectively storing sectors from the boot target medium based on a target policy, when the boot target medium is a local medium, and when the boot target medium is a remote medium, selectively storing a boot image file and auxiliary files based on the target policy.

22. A non-transitory machine readable medium having instructions stored therein that when executed by a machine, cause the machine to:
selectively store boot target data retrieved at boot time by a boot caching agent, wherein the boot target data is retrieved from a boot target medium and stored in a memory faster than the boot target medium, and wherein the boot target medium is one of a local medium or remote medium associated with a remote server accessible to the boot caching agent via a network; and
upon a reboot of an operating system, retrieve the boot target data from at least one of the stored boot target data and the boot target medium, the retrieving controlled by the boot caching agent, the retrieving comprising:
determining whether the boot target medium is the remote medium; and
if the boot target medium is the remote medium:
retrieving a validator from the remote medium, determining whether the stored boot target data is current using the validator, and if the stored boot target data is not current, retrieving boot image data and auxiliary files from the remote medium and storing the boot image data, auxiliary files and validator to the memory, and if the boot target medium is the local medium:
retrieving sectors from the local medium and selectively storing the retrieved sectors to faster memory.

23. The medium as recited in claim 22, wherein the boot caching agent resides in a first platform partition and the operating system resides in a second platform partition.

24. The medium as recited in claim 23, wherein the first platform partition is a virtual machine monitor, and the second partition is a virtual machine.

25. The medium as recited in claim 23, wherein the first platform partition is an embedded partition of a platform enabled with chipset partitioning.

26. The medium as recited in claim 23, wherein the faster memory is volatile system memory, and wherein the second partition has no access to the stored boot target data.

27. The medium as recited in claim 23, further comprising instructions that when executed by the machine, cause the machine to:
store an index of sectors retrieved from the boot target medium, when the boot target medium is a local medium, to identify stored sectors of data, by the boot caching agent.

28. The medium as recited in claim 23, wherein the retrieving the boot target data further comprises instructions that when executed, cause the machine to:
determine whether requested boot data has been stored and if not, retrieving the requested boot target data from the boot target medium, wherein the boot target data comprises boot sector information for a local medium, and wherein the boot target data comprises a boot image, selective auxiliary files and a validator for a remote medium, otherwise, retrieve the requested boot target data from the stored memory.

29. The medium as recited in claim 28, further comprising instructions that when executed by the machine, cause the machine to:
if the validation is successful, retrieve the boot target data from stored memory, but if the validation fails, then retrieve the boot target data from the remote boot target medium.

30. The medium as recited in claim 22 wherein selectively storing boot target data further comprise instructions that when executed cause the machine to:
selectively store sectors from the boot target medium based on a target policy when the boot target medium is a local medium, and when the boot target medium is a remote medium, selectively store a boot image file and auxiliary files based on the target policy.

* * * * *